US008769303B2

(12) United States Patent  (10) Patent No.: US 8,769,303 B2
Hallum et al.  (45) Date of Patent: Jul. 1, 2014

(54) INFRASTRUCTURE INDEPENDENT RECOVERY KEY RELEASE

(75) Inventors: Chris W. Hallum, Redmond, WA (US); William B. Lees, Kirkland, WA (US); Sachin Goel, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 70 days.

(21) Appl. No.: 13/310,813

(22) Filed: Dec. 5, 2011

(65) Prior Publication Data

US 2013/0145174 A1    Jun. 6, 2013

(51) Int. Cl.
G06F 12/14    (2006.01)
G06F 11/30    (2006.01)

(52) U.S. Cl.
USPC .......................... 713/189; 380/286; 713/194

(58) Field of Classification Search
None
See application file for complete search history.

(56) References Cited

U.S. PATENT DOCUMENTS

| | | | |
|---|---|---|---|
| 6,185,308 B1* | 2/2001 | Ando et al. ................ | 380/286 |
| 6,643,670 B2 | 11/2003 | Parham et al. | |
| 6,654,771 B1 | 11/2003 | Parham et al. | |
| 6,986,043 B2 | 1/2006 | Andrews | |
| 7,584,195 B2 | 9/2009 | Johnson et al. | |
| 7,590,868 B2* | 9/2009 | Musa et al. ................ | 713/193 |
| 7,831,833 B2 | 11/2010 | Gaylor | |
| 7,921,304 B2 | 4/2011 | Brace et al. | |
| 7,929,706 B2 | 4/2011 | Li | |
| 8,266,433 B1* | 9/2012 | Przykucki et al. ........... | 713/168 |
| 2002/0120637 A1 | 8/2002 | Parham et al. | |
| 2006/0085845 A1 | 4/2006 | Davis et al. | |
| 2006/0282881 A1 | 12/2006 | Johnson et al. | |
| 2006/0282900 A1 | 12/2006 | Johnson et al. | |
| 2006/0294378 A1 | 12/2006 | Lumsden | |
| 2007/0101434 A1 | 5/2007 | Jevans | |
| 2007/0124308 A1 | 5/2007 | Johnson | |
| 2007/0127719 A1 | 6/2007 | Selander | |
| 2008/0232593 A1 | 9/2008 | Hsu | |
| 2008/0235581 A1 | 9/2008 | Caporale | |
| 2008/0270781 A1 | 10/2008 | Ibrahim et al. | |
| 2009/0052669 A1 | 2/2009 | Ma | |
| 2009/0144557 A1* | 6/2009 | Sutton ......................... | 713/189 |
| 2009/0185688 A1 | 7/2009 | Lotspiech | |
| 2009/0210456 A1* | 8/2009 | Subramaniam ............. | 707/202 |
| 2009/0276844 A1 | 11/2009 | Gehrmann | |
| 2010/0086134 A1 | 4/2010 | Urech | |
| 2010/0154053 A1 | 6/2010 | Dodgson | |
| 2010/0162361 A1 | 6/2010 | Lees | |

(Continued)

OTHER PUBLICATIONS

Christopher et al, Proceedings of advances in computer security and Forensics(ACSF) 2007, Liverpool John Moores Univeritsty.*

(Continued)

Primary Examiner — Fikremariam A Yalew
(74) Attorney, Agent, or Firm — Jim Sfekas; Kate Drakos; Micky Minhas

(57) ABSTRACT

Aspects of the subject matter described herein relate to recovering locked data. In aspects, stakeholders of locked volume(s) are identified. Security data of the volume(s) that can be used to unlock the volume(s) is collected from one or more computing devices hosting the volume(s). The security data and stakeholder data is stored on a recovery store. If a stakeholder needs to unlock a volume, the stakeholder may communicate with a recovery manager, provide certain data, and receive data that may be used to unlock the volume. Auditing may be performed for attempts to obtain the unlocking data from the recovery store.

16 Claims, 6 Drawing Sheets

(56) References Cited

U.S. PATENT DOCUMENTS

| | | | |
|---|---|---|---|
| 2010/0175116 A1 | 7/2010 | Gum | |
| 2010/0202617 A1 | 8/2010 | Balakrishnan et al. | |
| 2010/0228990 A1* | 9/2010 | Billings et al. | 713/185 |
| 2010/0266132 A1 | 10/2010 | Bablani et al. | |
| 2011/0004758 A1 | 1/2011 | Walker | |
| 2011/0061112 A1 | 3/2011 | Berengoltz | |
| 2011/0126027 A1 | 5/2011 | Brace | |
| 2011/0276806 A1* | 11/2011 | Casper et al. | 713/189 |
| 2012/0009954 A1 | 1/2012 | Gadiraju | |
| 2013/0013787 A1 | 1/2013 | Johnson | |
| 2013/0148810 A1 | 6/2013 | Goel | |
| 2013/0160139 A1 | 6/2013 | Goel | |

OTHER PUBLICATIONS

Smith, et al., What's New in Microsoft Desktop Optimization Pack (MDOP): Microsoft BitLocker Administration and Monitoring (MBAM), Retrieved at <<http://media.ch9.ms/teched/na/2011/ppt/WCL317.pptx>>, Microsoft Tech.ed, North America, May 16-19, 2011, pp. 35.

"Deploying MBAM on Distributed Servers", Retrieved at <<http://onlinehelp.microsoft.com/en-us/mdop/hh285628.aspx>>, Retrieved Date: Oct. 5, 2011, pp. 4.

Hynes, Byron, "Advances in BitLocker Drive Encryption", Retrieved at <<http://technet.microsoft.com/en-us/magazine/2008.06.bitlocker.aspx>>, Retrieved Date: Oct. 5, 2011, pp. 6.

"Microsoft desktop optimization pack for software assurance, Virtualization and Manageability for a Flexible Workstyle", Retrieved at <<http://download.microsoft.com/download/2/0/5/2059593A-FF96-42C8-8560-71AD019503C6/MS_MDOP%20Bro_0611_Printer_f1_lowRes.pdf>>, Retrieved Date: Oct. 5, 2011, pp. 23.

"Planning and Configuring Group Policy for MBAM", Retrieved at <<http://onlinehelp.microsoft.com/en-us/mdop/hh285629.aspx>>, Retrieved Date: Oct. 5, 2011, pp. 8.

"Planning for Single Use Recovery Keys", Retrieved at <<http://onlinehelp.microsoft.com/en-us/mdop/hh301925.aspx>>, Retrieved Date: Oct. 10, 2011, p. 1.

Rose, Stephen L, "Simplify BitLocker Support with MBAM", Retrieved at <<http://windowsteamblog.com/windows/b/springboard/archive/2011/07/01/simplify-bitlocker-support-with-mbam.aspx>>, Jul. 1, 2011, pp. 3.

"BitLocker Drive Encryption Operations Guide: Recovering Encrypted Volumes with AD DS", Retrieved at <<http://technet.microsoft.com/en-us/library/cc771778(WS.10).aspx>>, Retrieved Date: Oct. 10, 2011, pp. 33.

U.S. Appl. No. 13/329,351, Non-Final Office Action mailed Jan. 22, 2013, 24 pages.

U.S. Appl. No. 13/329,351, Amendment dated Apr. 22, 2013, 20 pages.

"RSA Credential Manager", Retrieved at <<http://www.rsa.com/node.aspx?id=1180>>, Retrieved Date: Sep. 29, 2011, pp. 2.

"Enterprise Encryption Key Management", Retrieved at <<http://www.venafi.com/Products/Venafi-Encryption-Director/Encryption-Key-Management/Enterprise-Key-Management.aspx>>, Retrieved Date: Sep. 29, 2011, p. 1.

"TCG TPM Integration Test", Retrieved at <<http://msdn.microsoft.com/en-us/library/ff567627(v=vs.85).aspx>>, Retrieved Date: Sep. 29, 2011, pp. 10.

"Sophos SafeGuard ® Disk Encryption 4.60", Retrieved at <<http://tw.sophos.com/sophos/docs/eng/manuals/sde_46_heng.pdf>>, Jun. 2009, pp. 1-168.

"Cisco Storage Media Encryption", Retrieved at <<http://www.cisco.com/en/US/prod/collateral/ps4159/ps6409/ps6028/ps8502/product_data_sheet0900aecd8068ed59.html>>, Retrieved Date: Sep. 29, 2011, pp. 4.

"Blue Cross Blue Shield of Tennessee auto-encrypts patient data", Retrieved at <<http://www-01.ibm.com/software/success/cssdb.nsf/CS/STRD-8JZDVH?OpenDocument&Site=default&cty=en_us>>, Jul. 22, 2011, pp. 4.

U.S. Appl. No. 13/316,587, Office Action mailed Apr. 15, 2013, 17 pages.

U.S. Appl. No. 13/329,351, Notice of Allowance mailed Jul. 23, 2013, 12 pages.

U.S. Appl. No. 13/316,587, Amendment dated Aug. 15, 2013, 13 pages.

U.S. Appl. No. 13/316,587, Non-Final Office Action dated Nov. 6, 2013, 24 pages.

U.S. Appl. No. 13/316,587, Amendment dated Jan. 15, 2014, 14 pages.

* cited by examiner

US 8,769,303 B2

INFRASTRUCTURE INDEPENDENT RECOVERY KEY RELEASE

BACKGROUND

Some operating systems and other programs have the capability of encrypting data of a volume. This helps ensure that only the person(s) who knows the appropriate security codes is able to access data on the volume—even if the computer hosting the volume is stolen. A problem occurs, however, when legitimate stakeholders of the volume are not able to access the data on the volume. For example, if a volume is encrypted and a user of the volume forgets security codes for the volume, it may be computationally infeasible to calculate the security codes and thus decrypt the data of the volume.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to recovering locked data. In aspects, stakeholders of locked volume(s) are identified. Security data of the volume(s) that can be used to unlock the volume(s) is collected from one or more computing devices hosting the volume(s). The security data and stakeholder data are stored on a recovery store. If a stakeholder needs to unlock a volume, the stakeholder may communicate with a recovery manager, provide certain data, and receive data that may be used to unlock the volume. Auditing may be performed for attempts to obtain the unlocking data from the recovery store.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
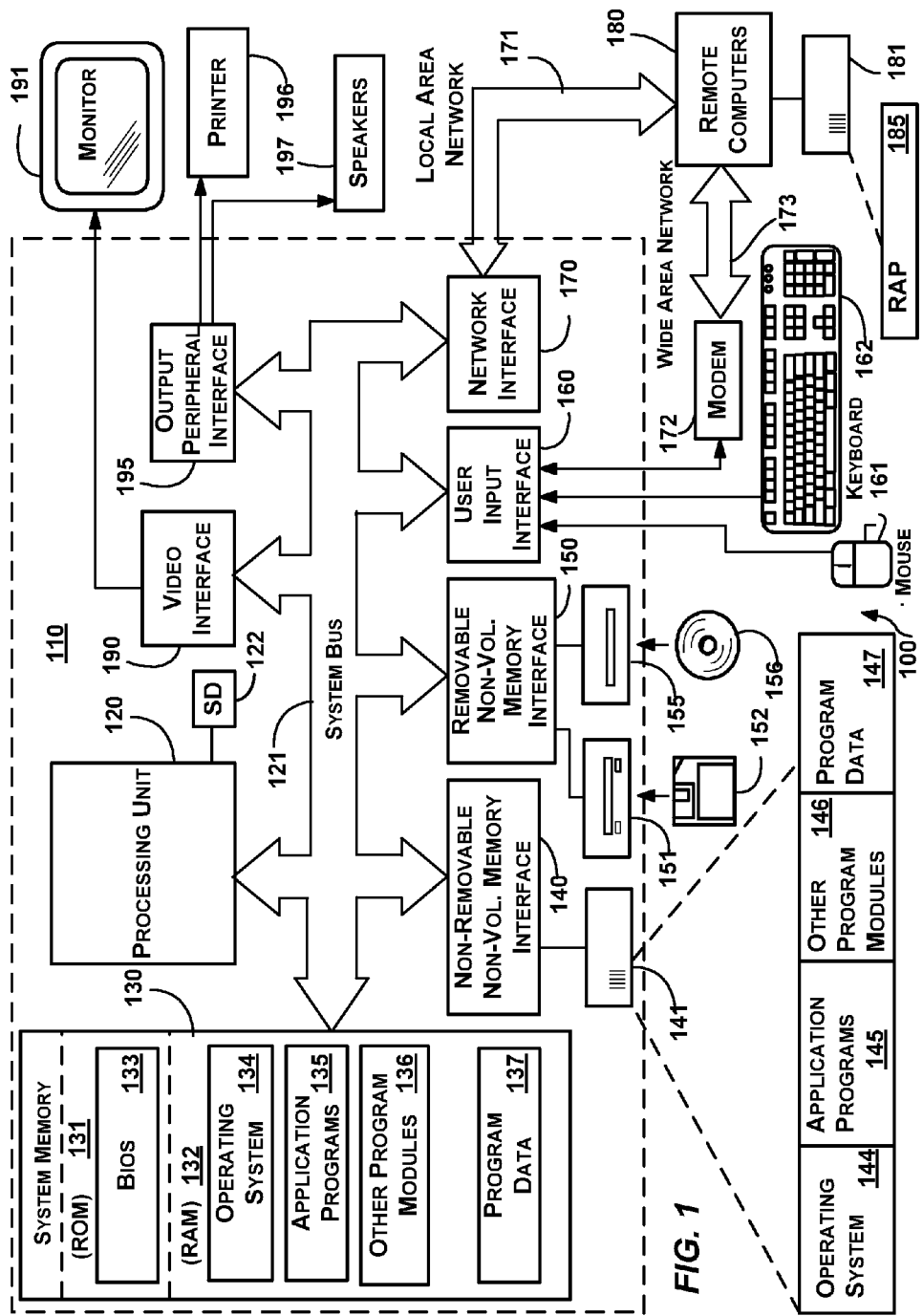
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Security Data Storage and Recovery

Figure 2:
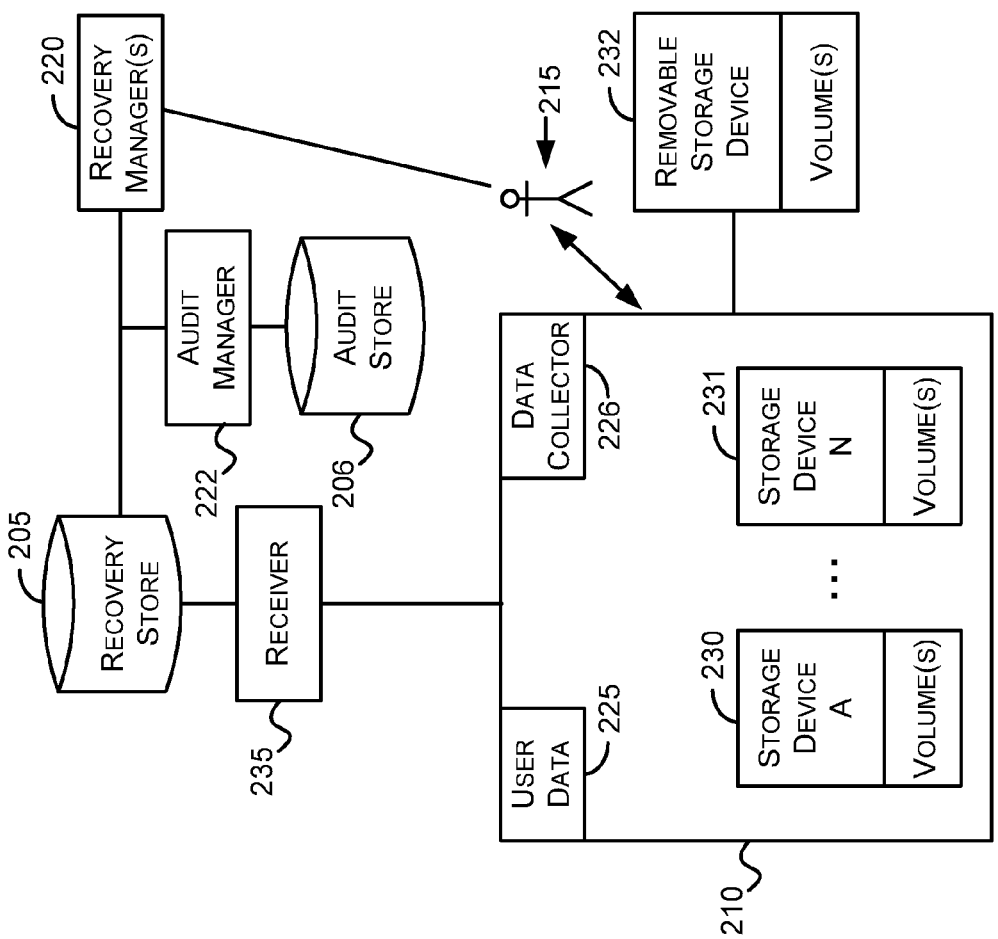
FIG. 2 is a block diagram that represents an exemplary environment in which aspects of the subject matter described herein may be implemented.

As mentioned previously, losing the security codes of an encrypted volume may cause a stakeholder of the volume to lose the ability to decrypt encrypted data of the volume. FIG. 2 is a block diagram that represents an exemplary environment in which aspects of the subject matter described herein may be implemented. The components illustrated in FIG. 2 are exemplary and are not meant to be all-inclusive of components that may be needed or included. In other embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

As used herein, the term component is to be read to include hardware such as all or a portion of a device, a collection of one or more software modules or portions thereof, some combination of one or more software modules or portions thereof and one or more devices or portions thereof, and the like. A component may include or be represented by code.

One or more of the components illustrated in FIG. 2 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to implement the components of FIG. 2 comprises the computer 110 of FIG. 1.

Turning to FIG. 2, the environment may include a recovery store 205, an audit store 206, a secured device 210, a user 215, a recovery manager(s) 220, an audit manager 222 and a recovery data receiver 235. The secured device 210 may include user data 225, a data collector 226, one or more storage devices 230-231, and be attached to a removable storage device 232 and remote storage (not shown).

The recovery store 205 and the audit store 206 may be implemented using any storage media capable of storing data. The storage media may include volatile memory (e.g., cache, RAM, and other volatile memory described in conjunction with FIG. 1) and nonvolatile memory (e.g., solid state storage, hard disk storage, and other nonvolatile memory described in conjunction with FIG. 1). In one embodiment, the recovery store 205 and the audit store 206 may be combined together in a single data store.

The recovery store 205 may be used to store data that may be used to unlock volume(s) of secured devices. Data that may be used to unlock a volume allows the volume to be decrypted either directly or through a chain of keys as described in more detail below.

Although as illustrated in FIG. 2, only one secured device (i.e., the secured device 210) is shown, there may be an arbitrary number of secured devices associated with an organization. The recovery store 205 may store a recovery key value for each volume of each secured device of an organization. A recovery key value may be used to unlock an encrypted volume as described in more detail below.

In the recovery store 205, a recovery key value may be part of a tuple that associates the recovery key value with other data. For example, the recovery store 205 may associate a recovery key value with a machine identifier, volume identifier, recovery key identifier, stakeholder data, a name of a computer/device that sent the above data, or other data described below. One or more portions of the data associated with the recovery key value may be used to obtain the recovery key value from the recovery store 205. The recovery key value may then be used to unlock the associated volume.

The secured device 210 may be connected to one or more internal storage devices (e.g., the storage devices 230-231), to one or more removable storage devices (e.g., the removable storage device 232), and to one or more remote storage devices (not shown). The storage devices 230-231 may be housed inside the chassis of the secured device 210 while the removable storage device 232 may be connected to the secured device 210 through an interface whereby the removable storage device 232 is readily attached and unattached from the secured device 210. Remote storage devices may be connected to the secured device 210 via a network. The storage devices 230-232 and the remote storage devices, if any, may be implemented using, for example, types of computer storage media described in conjunction with FIG. 1.

Each storage device may be formatted with one or more volumes. A volume is a storage area on the storage device that is accessible by a file system. A volume is often included on a single partition of the storage device, but may span partitions, be contained in a file, or be otherwise represented without departing from the spirit or scope of aspects of the subject matter described herein.

Each volume of a storage device may be encrypted using an encryption key. The encryption key may be secured (e.g., encrypted) by another encryption key which may be secured by another encryption key and so forth. For example, an operating system volume may store encryption keys for non-operating system volumes hosted on the same device.

The secured device 210 may be unable to decrypt data on a device unless a user (e.g., the user 215) supplies the secured device 210 with valid credentials. Using the valid credentials and potentially other data, the secured device 210 may generate or otherwise obtain an encryption key that allows the secured device 210 to decrypt encrypted data that is stored on a volume.

Multiple entities may have "property rights" in the data of an encrypted volume. The term "property rights" refers to a valid interest in obtaining the encrypted data of the volume in an unencrypted form. While in almost all cases a user who frequently uses the secured device 210 would have property rights in the data of a volume, other entities may also have property rights as well. For example, a company or other entity that owns the secured device 210, other users who also use the secured device 210, users who have the rights to logon to the secured device 210 (even if they have never logged on in the past), people who have created or updated documents that are stored on the secured device 210, and others may have property rights in the data of an encrypted volume. The term "stakeholder" is sometimes used to refer to an entity that has property rights to data stored on the volume.

Data that identifies stakeholders of a volume may be discovered by examining the secured device hosting the volume and by data external to the secured device as described in more detail below. The data used to determine a stakeholder may be configurable.

For example, one or more components may be configured to identify stakeholders by using data that includes one or more of the following:

1. Any user who has ever interactively logged on to the secured device 210. Interactively logging onto a device is described in more detail below.

2. Any user who has rights to logon to the secured device 210—even if the user has never logged onto the secured device 210.

3. Any user who has administrator rights to logon to the secured device 210—even if the administrator has never logged onto the secured device 210.

4. Users who frequently logon to the secured device 210 where "frequently" may be defined, for example, as a certain number of logons during a given period. Frequency may be weighted based on how recent each logon was with more recent logons having more weight in the frequency calculation.

5. Any user who is an owner or creator of content of the secured device. For example, some file systems, applications, or other components may indicate who owns/created a file. For example, ownership/creatorship of a word processing document may be indicated by metadata about the file.

6. Any users who are explicitly identified as stakeholders of the device. For example, a company may maintain a database that associates assets with certain employees. For example, an employee may be associated with the secured device 210. Such associations may be stored formally (e.g., via a database) or informally (e.g., via a document). Where associations are stored in a computer-readable form, they may be used to programmatically identify a stakeholder of the secured device 210.

For example, a component may identify additional stakeholders of a device by correlating a machine identifier with a network operating system, management infrastructure, or the like that performs network authentication. The network authentication system may have a set of ancillary stakeholders associated with the name of the machine in a separate secure infrastructure that is part of the network authentication. In one embodiment, the name of the machine may be the official, fully verified string name of the machine. When the component queries the network authentication, it may return a set of additional ancillary stakeholders to be included in data that identifies stakeholders of the device.

In one embodiment, the stakeholders may be limited in that they may only come from the universe of total possible principals in the network authentication system above. For example, in one embodiment, the stakeholders may be drawn from users in a domain. In another embodiment, stakeholders may not be limited to a single domain or even to principals of the network authentication system.

The above examples of stakeholders are not intended to be all-inclusive or exhaustive of all types of individuals or other entities that may legitimate interest in the data of the secured device 210. Based on the teachings herein, those skilled in the art may recognize other examples of individuals or other entities that may be classified as stakeholders without departing from the spirit or scope of aspects of the subject matter described herein.

Stakeholder data may be deduced from persistent data of a machine that houses a volume. For example, the user data 225 may include some or all of the information needed to determine whether a user is a stakeholder in the secured device. For example, the user data 225 may include profiles for user who have interactively logged onto the secured device 210, may include a list of users who may potentially logon to the secured device 210, may include data as to when logons have occurred, may include ownership/creatorship data, may include domain names, user names, or other stakeholder data, may include encryption key identifiers and encryption key values, may include machine identifiers, volume identifiers, and other computer configuration, and the like. The user data 225 may be found in one file, database, memory region, or other repository, or may be spread out through multiple files, databases, memory regions, or other repositories.

The data collector 226 may obtain data of stakeholders of volumes of the secured device 210. The data collector 226 may do this by querying the user data 225. The data collector 226 may also collect other data that is described in more detail below that allows decryption of an encrypted volume. Herein, the data the data collector 226 collects to unlock a volume is sometimes referred to as security data.

The data collector 226 may also obtain security data associated with each volume of the secured device 210 that allows unlocking the volume(s) of the secured device 210. The security data may be found in the user data 225. This security data may include, for example, one or more of a machine identifier, a volume identifier, a recovery key identifier, a recovery key value, and the like.

The machine identifier may identify the secured device 210. For example, the machine identifier may be encoded in hardware or stored in nonvolatile memory of the secured device 210. This machine identifier may serve to distinguish the secured device 210 from other secured devices, if any.

The volume identifier may identify a volume of the secured device. The volume identifier may be a string, number, or other data that identifies a volume. In one embodiment, the volume identifier is sufficient to identify the volume even if the storage device that houses the volume is removed or disconnected from the secured device 210.

Stakeholder data identifies entities who are stakeholders of a volume. As indicated previously, stakeholders may be identified from data of the secured device and from data external to the secured device. Stakeholder data may include any type of data that may be used to identify entities who are stakeholders of a volume. For example, stakeholder data may include logon facts such as domain names and user names of users. As another example, stakeholder data may include data that is derived from the logon facts through the use of a function. As another example, stakeholder data may include strings that have been assigned to identify users who are stakeholders.

The above examples of stakeholder data are not intended to be all-inclusive or exhaustive of the types of data that may be used to identify entities that are stakeholders of a volume. Based on the teachings herein, those skilled in the art may recognize many other types of data that may be used to identify stakeholders without departing from the spirit or scope of aspects of the subject matter described herein.

In one embodiment, stakeholders may be limited to users of a domain that includes the secured device. In this embodiment, stakeholder data may include identifiers of stakeholders identified by examining the secured device and may include identifiers of others in the domain who have been explicitly identified (e.g., via a database, document, or otherwise) as stakeholders of a volume of the secured device.

In another embodiment, stakeholders may not be limited to users of a domain that includes the secured device. In this embodiment, stakeholder data may include identifiers of stakeholders identified by examining the secured device and others in and/or outside the domain who have been explicitly identified as stakeholders of a volume of the secured device.

A recovery key identifier may include a string. This string may be displayed (e.g., on a display of the secured device 210) and responded to in a sequence of steps used to recover the recovery key value mentioned above. The recovery key identifier may be associated with a secured volume of the secured device 210. There may be a recovery key identifier associated with each secured volume of the secured device 210. Recovery key identifiers of different volumes are different. In one embodiment, recovery key identifiers may also be different for a given prefix substring (e.g., the first eight characters). A recovery key identifier may be printable or transmittable in plain text.

The recovery key value may be used to unlock the volume. Unlocking the volume means that the recovery key value may be used directly or indirectly to decrypt the volume. For example, in one implementation, the recovery key value may be the actual encryption key that can be used to decrypt the volume. The length of the recovery key value may be configurable and may vary from implementation to implementation. In one implementation, the length may be 48 digits. The recovery key value may be printable or transmittable in plain text.

If the recovery key value is not the actual encryption key that was used to encrypt the volume, it may be used indirectly to decrypt the volume by being used in a chain of two or more keys to obtain the encryption key. For example, the recovery key value may be used as a key to obtain the encryption key, the recovery key may be used to obtain a key that can then be used to obtain the encryption key, or the recovery key may be used in a longer chain of obtaining keys to obtain the encryption key.

The data collector 226 may, at configurable times (e.g., periodically, at certain times, or the like), obtain the security data and forward the security data to the recovery store 205 for storage. The security data sent by the data collector 226 for a stakeholder may be transmitted with a recovery key value of a volume to which a stakeholder has rights. The security data may be signed by the data collector 226 so that the receiving entity can verify that the security data received has not been tampered with. The security data may also be sealed in an operation (e.g., encryption) that makes the security data private.

The security data sent from the data collector 226 may pass through a recovery data receiver 235 that is in charge of storing the security data on the recovery store 205. In one implementation, the recovery data receiver 235 may reject a transmission of security data from the data collector 226 unless one or more of the following criteria are satisfied:

1. The security data is sealed when sealing is required;
2. The sending computer/device is a valid member of a network operating system, management infrastructure, or the like;
3. A string identifying the computer/device sending the security data is in valid form;
4. A string identifying the computer/device sending the security data is in an official form. For example, official form may mean that the string is fully qualified and is a well-known name (e.g., resolvable through a Domain Name System server).

The recovery data receiver 235 may receive security data from multiple devices of an organization. The data collector 226 may examine the user data 225 which may include, for example, examining machine configuration data, volume data, databases, files, and the like to obtain the security data.

As mentioned previously, the user data 225 may include various data regarding stakeholders of the data stored on the volumes of the storage devices 230-232. For example, the user data 225 may include user profiles for each user who has interactively logged onto the secured device 210. Interactively logging on refers to logging on via a user interface device (e.g., a keyboard, mouse, or other user interface device) directly attached to the secured device 210 or logging on remotely to the secured device and interacting with a user interface of the secured device 210 as if actually at the secured device 210.

As another example, the user data 225 may include data regarding the accounts of users who are allowed to logon to the secured device 210, even of users who have never actually logged on to the secured device 210.

The data collector 226 may collect stakeholder data for one or more types of stakeholders. For example, the data collector 226 may collect domain name and user name for just the stakeholders who have interactively logged onto the secured device, for just the stakeholders who have an account on the secured device, for both of the stakeholder types above, for a different combination of types of stakeholders, or the like.

The secured device 210 may deny access to the volumes 230-232 for any of a number of reasons. For example, if the BIOS, operating system, or other programs of the secured device 210 have been changed, if a user makes too many failed attempts to logon, if other configuration settings change, or if some other event occurs, the secured device 210 may deny access to the volumes 230-232 until recovery data is provided to the secured device 210.

If the secured device 210 enters a recovery mode, the secured device may display a string (e.g., a recovery key identifier) that the user 215 is to provide (or a portion thereof) to the recovery manager(s) 220. In response to providing the string and potentially stakeholder data, the recovery manager(s) 220 may provide a recovery key value that may be used to unlock a volume of the secured device 210.

For example, in one implementation, when the secured device 210 enters into recovery mode, the secured device 210 may display a number (which may be a recovery key identifier of a volume of the secured device 210). The number may be, for example 32 digits, 48 digits, or some other number of digits. The user may provide this number or a portion thereof to the recovery manager(s) 220 together with stakeholder data. In response, the recover manager(s) 220 may use the provided information to lookup a recovery key value in the recovery store 205. For example, if a user provides an 8 digit portion of the 48 digit number, a domain name, and a user name, a match may succeed if all the data provided exactly match corresponding data of a row of a table of the recovery store 205.

Matching may be performed character by character, by hashing and comparing hashes, or in another fashion. Using an external resource, a user name may be expanded to a fully qualified form prior to matching. After expansion, if used, matching may be performed without consulting external resources for additional information. In other words, in one embodiment, the data presented by the user after expansion, if needed, and the data included in the recovery store 205 may be compared without additional changes. For additional security, the stakeholder name as stored in the recovery store 205 may be withheld from the user requesting the recovery key value.

If the provided information matches the corresponding data, the recovery manager(s) 220 may then provide the recovery key value to the user 215. Using a user interface of the secured device 210, the user 215 may then enter the recovery key value. The above implementation is sometimes referred to as a "tier one" recovery protocol.

In another implementation, when the secured device 210 enters recovery mode, the user may communicate with a recovery manager that only requests the recovery key identifier or a portion thereof. The recovery manager(s) 220 may then lookup the recovery key value in the recovery store 205 using just the recovery key identifier. If the recovery key identifier matches a recovery key identifier in the recovery store 205, the recovery manager(s) 220 may obtain the recovery key value from the recovery store 205. The recovery manager(s) 220 may then provide this recovery key value to the user 215 who may then enter the recovery key value to unlock a volume of the secured device 210. This implementation is sometimes referred to as a "tier two" recovery protocol.

This tier two recovery protocol reduces the amount of data that is needed to obtain a recovery key value. In particular, the only information needed is the string displayed by the secured device 210 when the secured device enters recovery mode. This may be helpful, for example, when a user that routinely logged onto the secured device 210 has left a company but a legitimate stakeholder in data of the device still needs access to the data.

In some environments, the tier one and tier two recovery protocols may both be implemented. When insufficient information is available to obtain a recovery key value using the tier one recovery protocol, key recovery may be escalated to a tier two recovery protocol. In a tier two recovery protocol, additional checks may be performed (e.g., enhanced authentication of the requesting user, a check of the authority of the requesting user, title or other position of the requesting user, other checks, and the like) in conjunction with performing the tier two recovery protocol.

In one embodiment, whether the user 215 may access a tier one or tier two recovery manager may be governed by a list. The list may associate stakeholders with tier one and/or tier two recovery manager access.

In one embodiment, the recover manager(s) 220 may be implemented by a help desk person or the like who interfaces with a portal (e.g., a Web interface) or other user interface that interacts with the recovery store 205. The portal may display input elements (e.g., text boxes) for receiving various data (e.g., recovery key identifier, and potentially stakeholder data and other data), receive input from the help desk person, and display a recovery key value if the inputted items match corresponding data in the recovery store 205.

In the embodiment above, the recovery manager and the user 215 are two or more separate people. One person may be located by the secured device 210 while the recovery manager may be located at another location. The recovery manager may access the recovery store 205 via a secure Web portal or other secured application. For additional security, the recovery manager may be limited to the access to the recovery store 205 and may not have access to the secured device 210.

The user 215 may be able to view and interact with the secured device 210. The recovery manager 220 and the user 215 may communicate via telephone, network, e-mail, telegram, regular mail, or any other form of communication. The form of communication between the user 215 and a recovery manager may be chosen (e.g., by a business or other entity obtaining or providing the recovery). Where tier one and tier two recovery protocols are used, there may be one or more recovery managers for each of the tiers.

Furthermore, the help desk persons that may perform the role of a recovery manager may be governed by a network authentication system. The network authentication system may store data that associates roles with the help desk persons such that help desk persons are assigned as tier one and/or tier two recovery managers. In one embodiment, local security groups may be used to determine a role of a help desk person. A local security group may itself have as membership a set of network authentication system principal-names, and/or a set of network authentication system principle name-groups. In one embodiment, when chosen from the possible users of a network authentication system, role holders for tier one and tier two may be distinct from the set of stakeholder users.

In another embodiment, the recovery manager(s) 220 may be implemented as a component that receives data directly from the user 215 and provides the recovery key value upon receiving the appropriate information (e.g., recovery key identifier and potentially stakeholder data) from the user 215.

In one embodiment, the recovery manager(s) 220 may authenticate the user 215. This may be done, for example, by asking one or more challenge questions to which the user must respond, receiving a PIN, password, or other user-known data from the user, obtaining, with consent, biometric data (e.g., fingerprint, retina, DNA, or other biometric data), receiving a code from a portable item (e.g., a USB key, smart card, or the like), obtaining other credentials, a combination of two or more of the above, and the like. This information may authenticate that the user 215 is the stakeholder the user 215 represents the user 215 is.

It is not required that the recovery manager(s) 220 follow a key release procedure that is totally secure from social engineering or other attacks. For example, one key release procedure may include verifying that the communication comes from a company-trusted telephone number or other company-trusted communication endpoint and obtaining varying amounts of data in conjunction with obtaining a key recovery value from the recovery store 205. The varying amounts of information may be as little as a recovery key identifier or even another identifier (e.g., serial number, asset number, owner or user name, or the like) that identifies the secured device 210.

The audit manager 222 may monitor any interactions, both successful and unsuccessful, to obtain data from the recovery store 205. The audit manager 222 may collect information that identifies the recovery manager making the attempt, the recovery key identifier and other lookup data, if any, used in making the attempt, information about the user 215 as reported to the recovery manager, timestamp data, an identifier of the secured device 210 for which the request was made, whether the key recovery value was disclosed in response to the attempt, other information, and the like. The audit manager 222 may persist this information in the audit store 206.

Figure 3:
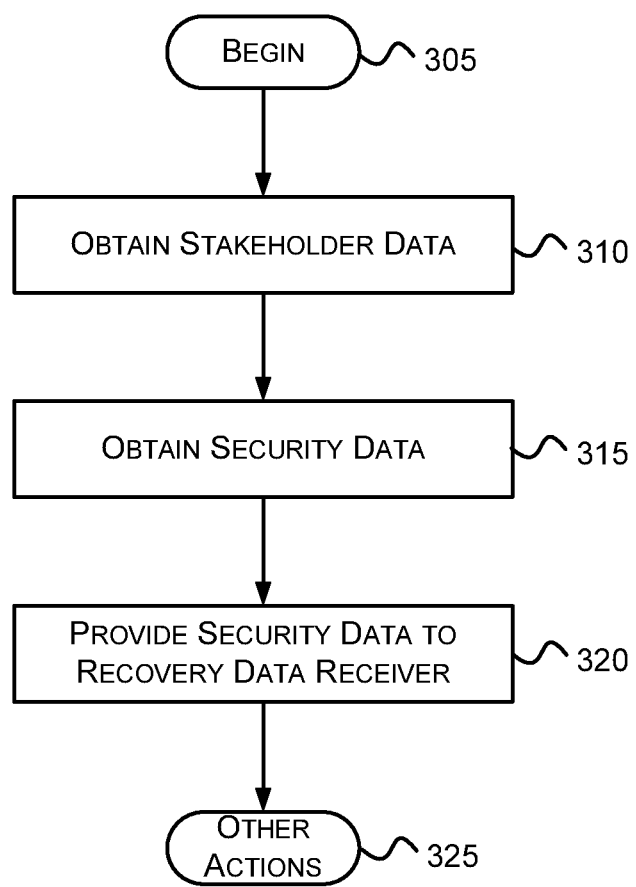
FIG. 3 is a flow diagram that generally represents exemplary actions that may occur on a secured device in obtaining security data for a recovery store in accordance with aspects of the subject matter described herein.

FIGS. 3-6 are flow diagrams that generally represent exemplary actions that may occur in accordance with aspects of the subject matter described herein. For simplicity of explanation, the methodology described in conjunction with FIGS. 3-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events FIG. 3 is a flow diagram that generally represents exemplary actions that may occur on a secured device in obtaining security data for a recovery store in accordance with aspects of the subject matter described herein. At block 305, the actions begin.

At block 310, stakeholder data is obtained. The stakeholder data indicates stakeholders of protected data that is encrypted on a volume. For example, referring to FIG. 2, the data collector 226 may obtain stakeholder data from a one or more files, databases, memory regions, or the like including locations that store the user data 225.

At block 315, security data associated with a locked volume is obtained. For example, the security data may be obtained from one or more databases, memory regions, or other repositories upon which the user data 225 is stored. The security data is usable to unlock the volume as indicated previously.

At block 320, the security data and stakeholder data is provided to a receiver for storing in a recovery store. For example, referring to FIG. 2, the data collector 226 provides the security data and stakeholder data to the recovery data receiver 235 for storing the security data on the recovery store 205.

At block 325, other actions, if any may be performed. For example, periodically or at other times, the actions above may be repeated to update the recovery store with security data of locked volumes and stakeholder data.

Figure 4:
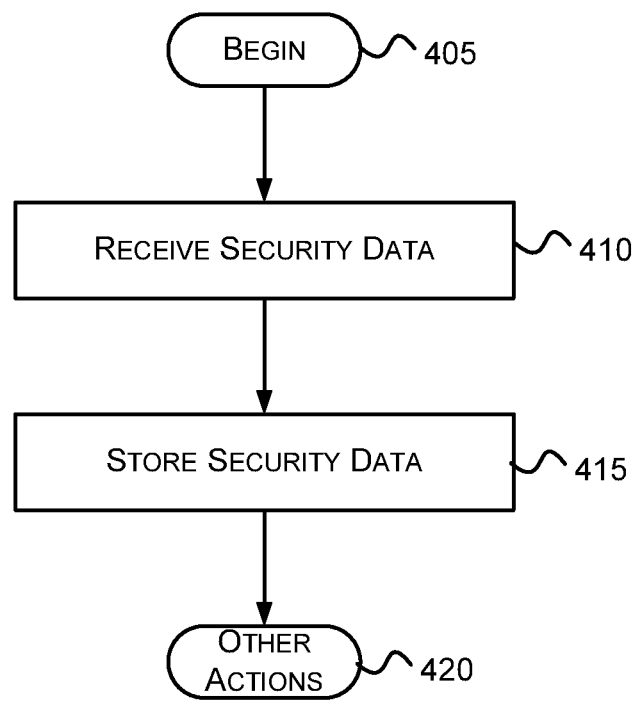
FIG. 4 is a flow diagram that generally represents exemplary actions that may occur to store the security data on a recovery store in accordance with aspects of the subject matter described herein.

FIG. 4 is a flow diagram that generally represents exemplary actions that may occur to store the security data on a recovery store in accordance with aspects of the subject matter described herein. At block 405, the actions begin.

At block 410, security data and stakeholder data are received. For example, referring to FIG. 2, the recovery data receiver 235 may receive security data from the data collector 226 and/or other devices (not shown). In receiving the data, the recovery data receiver 235 may, for example, establish a secure channel if appropriate, verify that the sender is a valid member of a management infrastructure, and verify that the format of the identifier of the sender.

At block 415, the security data is stored. For example, referring to FIG. 2, after receiving the security data, the recovery data receiver 235 may store the security data on the recovery store 205. The recovery data receiver 235 may commit the data to the recovery store 205 before returning from this step.

At block 420, other actions, if any may be performed. For example, each time a computing device sends security data to the recovery data receiver 235, the actions above may be repeated.

Figure 5:
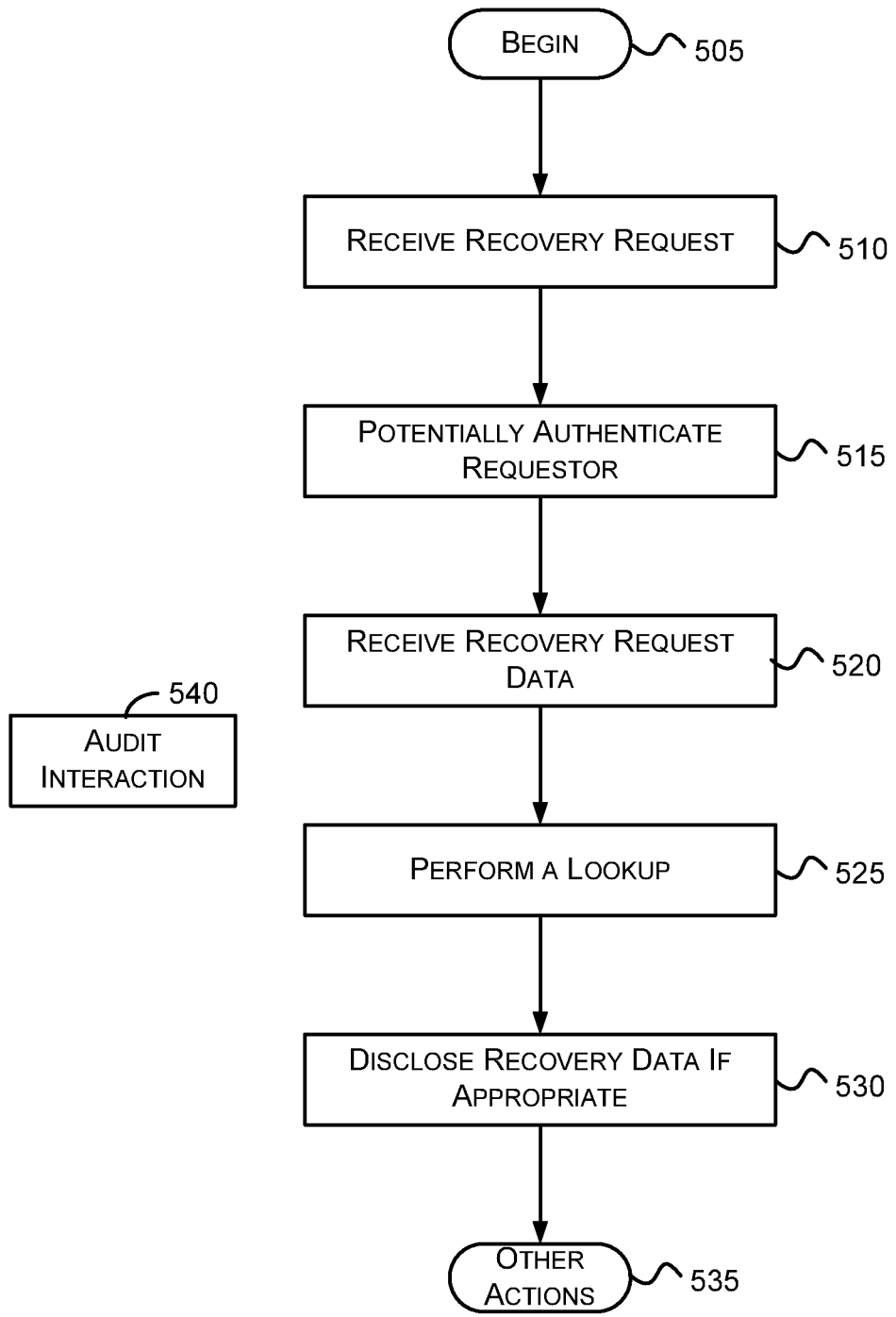
FIG. 5 is a flow diagram that generally represents exemplary actions that may occur in response to a recovery request in accordance with aspects of the subject matter described herein.

FIG. 5 is a flow diagram that generally represents exemplary actions that may occur in response to a recovery request in accordance with aspects of the subject matter described herein. At block 505, the actions begin.

At block 510, a recovery request is received. For example, referring to FIG. 2, the recover manager(s) 220 may receive from a requestor (e.g., the user 215) a request that a recovery be performed.

At block 515, the requestor may be authenticated. For example, referring to FIG. 2, the recover manager(s) 220 may ask a challenge question to which the user must respond for authentication. As other examples, the recovery manager(s) 220 may:

1. Authenticate that the requestor is a valid member of the network security and that the requestor's full user name can be obtained;
2. Use something that the requestor possesses together with something the requestor knows during the authentication; and
3. Vary what data is needed from the requestor based on whether the requestor is mapped to tier one or tier two.

The recovery manager(s) 220 may also use other authentication techniques including those described earlier without departing from the spirit or scope of aspects of the subject matter described herein.

At block 520, recovery request data is received from the requestor. For example, the recover manager(s) 220 may receive recovery request data from the user 215. Recovery request data may include, for example, a recovery key identifier or portion thereof connected to a computing device (e.g., the secured device 210). Recovery request data may also include stakeholder data such as user name, domain name, and other stakeholder data mentioned previously.

At block 525, a lookup is performed to find the recovery key value. A lookup in a tier two recovery protocol may involve just the recovery key identifier or a portion thereof. A lookup in a tier one recover protocol may involve the recovery key identifier or a portion thereof together with stakeholder data which may include, for example, a user name and domain name. In this case, a lookup succeeds only if the recovery key identifier or portion thereof, the user name, and the domain name match corresponding data associated with the key recovery value. For example, if a portion of the recovery key identifier and the user name and domain are given, the recovery key value may only be provided if these three values match corresponding values that are associated with the recovery key value in the recovery store 205.

At block 530, recovery data (e.g., the recovery key value) is disclosed if appropriate. For example, referring to FIG. 2, if the lookup succeeds, the recovery key value found is disclosed to the user 215. As another example, if authentication is desired, the recovery key value may only be disclosed if the lookup succeeds and the user 215 is authenticated.

At block 535, other actions, if any, may be performed. For example, prior to a recovery request occurring, security data may be received that includes the recovery key identifier or portion thereof, and the recovery key value. In addition, stakeholder data may be received in conjunction with receiving the security data. The security data and the stakeholder data may then be stored in the recovery store such that the elements of the security data and the stakeholder data are associated with each other.

At block 540, auditing may occur in conjunction with any actions associated with an attempt to obtain data from the recovery store. Auditing may occur in conjunction with one or more of the actions associated with FIG. 5. As explained previously, auditing may include, for example, collecting audit data that identifies a recovery manager making the attempt, a tier associated with the request (e.g., tier one or tier two), the recovery key identifier or portion thereof, other lookup data, if any, used in the attempt, data about the requestor (e.g., user name, domain name, IP address, other data, and the like) as reported to the recovery manager, timestamp data (e.g., a time at which the attempt occurred or data was disclosed), an identifier of the secured device, and whether the key recovery value was disclosed in response to the attempt.

Figure 6:
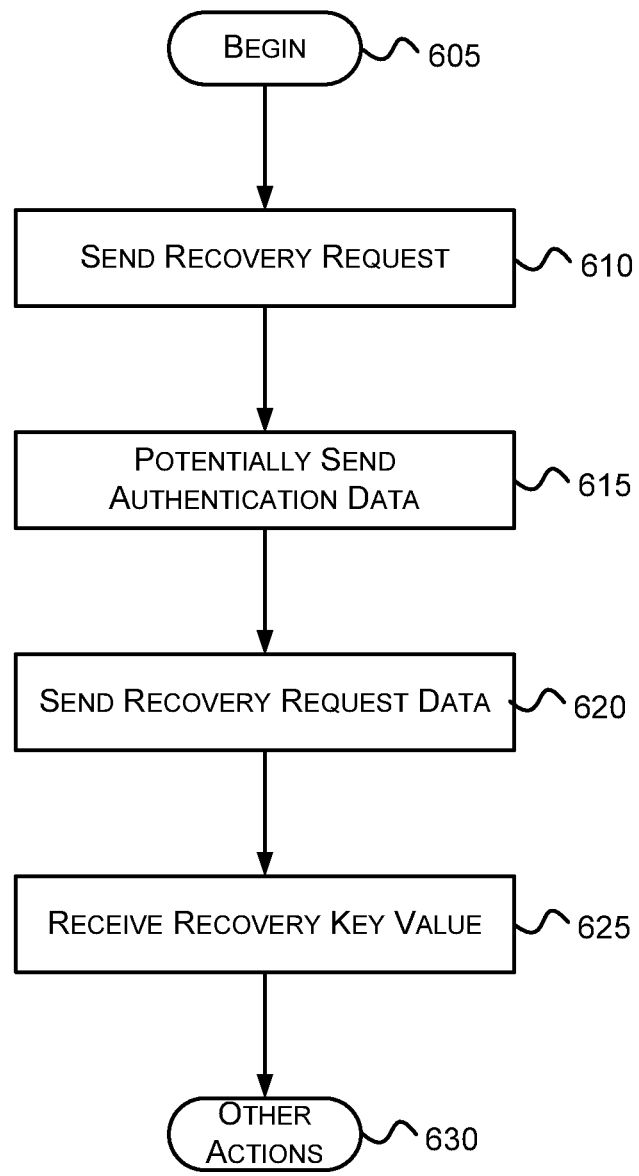
FIG. 6 is a flow diagram that generally represents exemplary actions that may occur from a requestor's perspective to obtain recovery data in accordance with aspects of the subject matter described herein.

FIG. 6 is a flow diagram that generally represents exemplary actions that may occur from a requestor's perspective to obtain recovery data in accordance with aspects of the subject matter described herein. At block 605, the actions begin.

At block 610, a recovery request is sent. For example, referring to FIG. 2, the user 215 may establish a communication with the recover manager(s) to attempt to obtain a recovery key value for a volume on the storage 230.

At block 615, authentication data may potentially be sent. For example, referring to FIG. 2, the user 215 may answer a challenge question posed by the recovery manager(s) 220.

At block 620 recovery request data is provided. For example, referring to FIG. 2, the user 215 may indicate the recovery key identifier or a portion thereof and potentially stakeholder data to the recovery manager(s) 220.

At block 625, recovery data (e.g., a recovery key value) may be received. For example, referring to FIG. 2, provided that the user 215 is authenticated and the lookup to the recovery store 205 succeeds, the recovery manager(s) 220 may provide a recovery key value to the user 215.

At block 630, other actions, if any, may be performed. For example, referring to FIG. 2, the user 215 may enter the recovery key value obtained via a user interface of the secured device 210 to unlock a volume connected to the storage device 210.

As can be seen from the foregoing detailed description, aspects have been described related to recovering locked data. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
    obtaining stakeholder data that indicates a plurality of stakeholders of protected data that is encrypted on a volume, the stakeholder data obtained by examining a computing device that is connected to a storage device that includes the volume and examining data external to the computing device;
    obtaining security data associated with the volume, the security data usable to unlock the volume, wherein obtaining security data comprises obtaining a recovery key identifier and a recovery key value, the recovery key value obtained by providing the recovery key identifier or a portion thereof to a recovery manager and receiving in response thereto the recovery key value, the recovery key value being obtained from a recovery store by the recovery manager by using the recovery key identifier or the portion thereof;
    signing the security data so that a recovery data receiver can verify that the security data received has not been tampered with; and
    providing the signed security data and the stakeholder data to the recovery data receiver for storing in the recovery store, wherein the recovery store is external to the computing device.

2. The method of claim 1, wherein obtaining stakeholder data comprises obtaining user data that identifies users who have interactively logged onto the computing device that is connected to the storage device that includes the volume.

3. The method of claim 1, wherein obtaining stakeholder data comprises obtaining user data that identifies users who are allowed to logon to the computing device that is connected to the storage device that includes the volume.

4. The method of claim 1, wherein obtaining stakeholder data comprises obtaining user data that identifies users who have administrator accounts to logon to the computing device that is connected to the storage device that includes the volume.

5. The method of claim 1, wherein obtaining stakeholder data comprises obtaining user data that identifies entities that created content that is stored on the volume.

6. The method of claim 1, wherein obtaining stakeholder data comprises obtaining identifiers of stakeholders of the protected data and wherein obtaining security data further comprises obtaining one or more of: a machine identifier, and a volume identifier.

7. The method of claim 6, further comprising transmitting one or more of the machine identifier, the volume identifier, and a stakeholder identifier together with the recovery key identifier or a portion thereof to a recovery manager for lookup of the recovery key value on the recovery store and receiving in response thereto the recovery key value.

8. A computer storage memory having computer-executable instructions, which when executed perform actions, comprising:
    receiving, from a requestor, for a volume, a recovery key identifier or portion thereof, the volume on a storage device connected to a computing device, the volume encrypted with an encryption key, wherein the recovery key identifier is displayed to the requestor on the computing device;
    external to the computing device, performing a lookup of a recovery key value based on the recovery key identifier, the recovery key value associated with the recovery key identifier, the recovery store previously populated with the recovery key value by receiving security data from a data collector hosted on the secured device;
    if the lookup succeeds, disclosing the recovery key value to the requestor, the recovery key value including data usable to unlock the volume; and
    auditing an attempt to obtain data from the recovery store, wherein auditing an attempt to obtain data from the recovery store comprises collecting audit data that identifies a recovery manager making the attempt, the recovery key identifier or portion thereof, other lookup data, if any, used in the attempt, data about the requestor as reported to the recovery manager, timestamp data, an identifier of the secured device, and whether the key recovery value was disclosed in response to the attempt.

9. The computer storage memory of claim 8, further comprising authenticating the requestor prior to providing the recovery key value to the requestor.

10. The computer storage memory of claim 8, further comprising, receiving from the requestor, a user name and domain name and wherein performing a lookup of a recovery key value based on the recovery key identifier comprises performing the lookup based on the recovery key identifier, the user name, and the domain name, the lookup succeeding only if the recovery key identifier or portion thereof, the user name, and the domain name match corresponding data associated with the key recovery value, the corresponding data stored in the recovery store.

11. The computer storage memory of claim 8, further comprising receiving security data and storing the security data in the recovery store, the security data including the recovery key identifier or the portion thereof and the recovery key value.

12. The computer storage memory of claim 11, further comprising receiving a logon fact, associating the logon fact with the key recovery value, and requiring that the logon fact be given before disclosing the recovery key value.

13. In a computing environment, a system, comprising:
a computing device having a locked volume, the locked volume residing on a storage device connected to the computing device, the locked volume being encrypted by an encryption key;
a data store that includes stakeholder data that indicates a plurality of stakeholders of the locked volume, each stakeholder having a right to at least some data stored in the locked volume; and
a data collector operable to perform actions, comprising:
 obtaining the stakeholder data from the data store,
 obtaining security data associated with the locked volume, the security data usable to unlock the locked volume, wherein obtaining security data comprises obtaining a recovery key identifier and a recovery key value, the recovery key value obtained by providing the recovery key identifier or a portion thereof to a recovery manager and receiving in response thereto the recovery key value, the recovery key value being obtained from a recovery data store by the recovery manager by using the recovery key identifier or the portion thereof,
 signing the security data so that the recovery data store can verify that the security data received has not been tampered with; and
 securely providing the security data and the stakeholder data to the recovery data store external to the computing device.

14. The system of claim 13, further comprising the recovery manager operable to provide at least some of the security data associated with the locked volume in conjunction with attempting to obtain the recovery key value from the recovery data store, the recovery key value usable to unlock the locked volume.

15. The system of claim 14, wherein the recovery manager is further operable to obtain the recovery key identifier or portion thereof together with a stakeholder identifier from a requestor seeking to obtain the recovery key value, the recovery key value usable to unlock the locked volume, the recovery manager being further operable to authenticate the requestor.

16. The system of claim 13, further comprising an audit manager operable to log any interaction between the recovery manager and the recovery store by storing audit data in an audit store, the audit data including one or more of: an identifier of the recovery manager, a recovery key identifier or portion thereof used in the interaction, data about a requestor for whom the recovery key value is sought, timestamp data, an identifier of the computing device, and whether the key recovery value was disclosed in the interaction.

* * * * *